US012643420B2

(12) United States Patent
Ammanamanchi et al.

(10) Patent No.: US 12,643,420 B2
(45) Date of Patent: Jun. 2, 2026

(54) SYSTEMS AND METHODS FOR INTEGRATED HIGH VOLTAGE AND LOW VOLTAGE CONVERTER FOR BIDIRECTIONAL ONBOARD BATTERY CHARGER

(71) Applicant: BorgWarner US Technologies LLC, Wilmington, DE (US)

(72) Inventors: Venkata Jaya Sai Praneeth Ammanamanchi, Lamadelaine (LU); Alexandre M. S. Reis, Westfield, IN (US); Joseph A. Engel, Oberkorn (LU); Scott E. Bauer, Holly, MI (US)

(73) Assignee: BorgWarner US Technologies LLC, Wilmington, DE (US)

( * ) Notice: Subject to any disclaimer, the term of this patent is extended or adjusted under 35 U.S.C. 154(b) by 199 days.

(21) Appl. No.: 18/497,514

(22) Filed: Oct. 30, 2023

(65) Prior Publication Data

US 2025/0135926 A1     May 1, 2025

(51) Int. Cl.
| | |
|---|---|
| *B60L 53/22* | (2019.01) |
| *H02M 1/42* | (2007.01) |
| *H02M 3/335* | (2006.01) |

(52) U.S. Cl.
CPC ........... *B60L 53/22* (2019.02); *H02M 1/4208* (2013.01); *H02M 3/33584* (2013.01);
(Continued)

(58) Field of Classification Search
CPC ......... B60L 53/00; B60L 53/10; B60L 53/20;

B60L 53/22; B60L 53/24; B60L 53/30; B60L 53/50; B60L 53/53; B60L 53/60; B60L 2210/00; B60L 2210/10; B60L 2210/12; B60L 2210/14; B60L 2210/30;
(Continued)

(56) References Cited

U.S. PATENT DOCUMENTS

| | | | | |
|---|---|---|---|---|
| 6,297,616 | B1 * | 10/2001 | Kubo | ..................... B60L 53/122 |
| | | | | 320/116 |
| 9,931,951 | B2 | 4/2018 | Khaligh et al. | |

(Continued)

FOREIGN PATENT DOCUMENTS

| | | |
|---|---|---|
| CN | 113972729 A | 1/2022 |
| EP | 1020973 A2 | 7/2000 |

(Continued)

*Primary Examiner* — Thienvu V Tran
*Assistant Examiner* — Carlos O Rivera-Perez
(74) *Attorney, Agent, or Firm* — Joshua M. Haines; Bookoff McAndrews, PLLC

(57) ABSTRACT

A system includes: an alternating current (AC) to direct current (DC) converter (AC-DC converter), the AC-DC converter connectable to a line voltage; and a DC to DC converter (DC-DC converter) connected to the AC-DC converter, the DC-DC converter including: a high voltage buck-boost converter having a secondary side connectable to a high voltage battery; a low voltage buck-boost converter having a secondary side connectable to a low voltage battery; and one or more transformers having a primary side connected to the AC-DC converter, a secondary side connected to a primary side of the high voltage buck-boost converter, and a tertiary side connected to a primary side of the low voltage buck-boost converter.

17 Claims, 12 Drawing Sheets

(52) U.S. Cl.
CPC ....... *B60L 2210/12* (2013.01); *B60L 2210/14*
(2013.01); *B60L 2210/30* (2013.01)

(58) Field of Classification Search
CPC ............. B60L 2210/40; B60L 2210/42; B60L
2210/44; H02M 1/0067; H02M 1/007;
H02M 1/0074; H02M 1/0077; H02M
1/008; H02M 1/32; H02M 1/36; H02M
1/42; H02M 1/4208; H02M 1/4216;
H02M 1/4225; H02M 1/4233; H02M
1/4241; H02M 1/425; H02M 1/4258;
H02M 1/4275; H02M 1/4283; H02M
1/4291; H02M 3/01; H02M 3/22; H02M
3/24; H02M 3/28; H02M 3/285; H02M
3/315; H02M 3/335; H02M 3/33523;
H02M 3/33553; H02M 3/33561; H02M
3/33569; H02M 3/33571; H02M 3/33573;
H02M 3/33576; H02M 3/33584; H02M
3/33592; H02M 3/155; H02M 3/156;
H02M 3/158; H02M 3/1582; H02M
3/1584; H02M 3/1588; H02M 7/217;
H02M 7/219; H02M 7/66; H02M 7/68;
H02M 7/757; H02M 7/7575; Y02T 10/70;
Y02T 10/7072

USPC ..... 363/15–21.3, 21.06, 21.07, 21.14, 21.15,
363/34, 35, 37, 50–58, 65, 67–70, 123,
363/124, 125, 127, 131, 132;
323/222–226, 259, 266, 267, 271–276,
323/282–285, 351; 320/103, 104, 106,
320/107, 109, 110, 111, 120, 121, 135,
320/140
See application file for complete search history.

(56) References Cited

U.S. PATENT DOCUMENTS

| | | | |
|---|---|---|---|
| 11,458,856 B2 | 10/2022 | Paryani et al. | |
| 11,491,883 B2 | 11/2022 | Khaligh et al. | |
| 2012/0235626 A1 | 9/2012 | Oh et al. | |
| 2017/0203658 A1* | 7/2017 | Jang .......................... | H02J 7/04 |
| 2020/0212816 A1* | 7/2020 | Sun .......................... | H02J 7/485 |
| 2021/0155100 A1 | 5/2021 | Khaligh et al. | |
| 2022/0278529 A1 | 9/2022 | Gannamaneni et al. | |
| 2025/0135927 A1* | 5/2025 | Ammanamanchi .......................... | |
| | | | H02M 1/0077 |

FOREIGN PATENT DOCUMENTS

| | | | |
|---|---|---|---|
| FR | 3036864 B1 | 6/2017 | |
| WO | 2021247278 A1 | 12/2021 | |

\* cited by examiner

SYSTEMS AND METHODS FOR INTEGRATED HIGH VOLTAGE AND LOW VOLTAGE CONVERTER FOR BIDIRECTIONAL ONBOARD BATTERY CHARGER

TECHNICAL FIELD

Various embodiments of the present disclosure relate generally to systems and methods for a DC-DC converter including a configurable high voltage and low voltage connection, and a battery charger including the configurable DC-DC converter for electric vehicles.

BACKGROUND

In the field of battery chargers, a two-stage layout is generally used to meet a requirement for use in automotive vehicles as an onboard charger. These onboard chargers have high power density, with less weight and require less space. The configuration layout used in single-phase or three-phase chargers includes an alternating current (AC) to direct current (DC) Power Factor Correction (PFC) converter at stage I and an isolated DC-DC converter at stage II. Battery chargers are configured for specific applications, and may not operate at a high efficiency for different power requirements.

The present disclosure is directed to overcoming one or more of these above-referenced challenges.

SUMMARY OF THE DISCLOSURE

In some aspects, the techniques described herein relate to a system including: an alternating current (AC) to direct current (DC) converter (AC-DC converter), the AC-DC converter connectable to a line voltage; and a DC to DC converter (DC-DC converter) connected to the AC-DC converter, the DC-DC converter including: a high voltage buck-boost converter having a secondary side connectable to a high voltage battery; a low voltage buck-boost converter having a secondary side connectable to a low voltage battery; and one or more transformers having a primary side connected to the AC-DC converter, a secondary side connected to a primary side of the high voltage buck-boost converter, and a tertiary side connected to a primary side of the low voltage buck-boost converter.

In some aspects, the techniques described herein relate to a system, wherein the DC-DC converter further includes: a high voltage bridge rectifier connected to the secondary side of the one or more transformers and the primary side of the high voltage buck-boost converter; and a low voltage bridge rectifier connected to the tertiary side of the one or more transformers and the primary side of the low voltage buck-boost converter.

In some aspects, the techniques described herein relate to a system, further including: one or more controllers configured to control an operation of the high voltage buck-boost converter and the low voltage buck-boost converter to control a power transfer between two or more of the line voltage, the high voltage battery, or the low voltage battery.

In some aspects, the techniques described herein relate to a system, wherein: the high voltage buck-boost converter includes a first high voltage switch and a second high voltage switch, and the low voltage buck-boost converter includes a first low voltage switch and a second low voltage switch.

In some aspects, the techniques described herein relate to a system, wherein the one or more controllers are further configured to: control an operation of the first high voltage switch, the second high voltage switch, the first low voltage switch, and the second low voltage switch to configure the DC-DC converter into each of (i) a charging mode with both an HV and LV buck operation, (ii) a charging mode with an LV only buck operation, (iii) an HV to LV conversion mode with HV and LV buck operation, (iv) an HV to LV conversion mode with HV only buck operation, and (v) an HV to LV conversion mode with no HV or LV buck operation.

In some aspects, the techniques described herein relate to a system, wherein the one or more controllers are further configured to operate the DC-DC converter in a capacitor pre-charge operation.

In some aspects, the techniques described herein relate to a system, wherein the DC-DC converter further includes: a middle voltage buck-boost converter having a primary side connected in parallel with the low voltage buck-boost converter and a secondary side connectable to a middle voltage battery.

In some aspects, the techniques described herein relate to a system, wherein the DC-DC converter further includes: a bridge driver having a primary side connected to the AC-DC converter and a secondary side connected to the one or more transformers.

In some aspects, the techniques described herein relate to a system, wherein the DC-DC converter further includes: one or more of a primary transformer isolation switch, a high voltage isolation switch, or a low voltage isolation switch.

In some aspects, the techniques described herein relate to a system, further including: one or more controllers configured to control an operation of the one or more of the primary transformer isolation switch, the high voltage isolation switch, or the low voltage isolation switch to control a power transfer between two or more of the line voltage, the high voltage battery, or the low voltage battery.

In some aspects, the techniques described herein relate to a system, further including: one or more controllers configured to control an operation of the one or more of the primary transformer isolation switch, the high voltage isolation switch, or the low voltage isolation switch based on a fault status of one or more of the AC-DC converter, the high voltage buck-boost converter, or the low voltage buck-boost converter.

In some aspects, the techniques described herein relate to a system, further including: the high voltage battery connected to the DC-DC converter; and the low voltage battery connected to the DC-DC converter, wherein the system is provided as a bidirectional battery charger configured to: receive input AC power from the line voltage through the AC-DC converter, convert the input AC power to output DC power, and supply the output DC power to charge one or more of the high voltage battery or the low voltage battery in a grid-to-battery operation, and receive input DC power from one or more of the high voltage battery or the low voltage battery through the DC-DC converter, convert the input DC power to output AC power, and supply the output AC power to a load of the line voltage in a battery-to-grid operation.

In some aspects, the techniques described herein relate to a system, further including: an electric vehicle including the high voltage battery connected to the DC-DC converter.

In some aspects, the techniques described herein relate to a system including: a DC to DC converter (DC-DC converter) including: a high voltage buck-boost converter having a secondary side connectable to a high voltage battery;

a low voltage buck-boost converter having a secondary side connectable to a low voltage battery; and one or more transformers having a primary side connectable to an AC-DC converter, a secondary side connected to a primary side of the high voltage buck-boost converter, and a tertiary side connected to a primary side of the low voltage buck-boost converter.

In some aspects, the techniques described herein relate to a system, further including: one or more controllers configured to control an operation of the DC-DC converter to control a power transfer between two or more of the AC-DC converter, the high voltage battery, or the low voltage battery.

In some aspects, the techniques described herein relate to a method for controlling a system including a DC-DC converter including one or more transformers, a high voltage buck-boost converter, and a low voltage buck-boost converter, the method including performing, by one or more controllers, operations including: controlling an operation of the high voltage buck-boost converter and the low voltage buck-boost converter to control a power transfer through the one or more transformers and one or more of the high voltage buck-boost converter or the low voltage buck-boost converter.

In some aspects, the techniques described herein relate to a method, wherein the operations further include: controlling an operation of a bridge driver of the DC-DC converter to operate in each of a half-bridge driver configuration and in a full-bridge driver configuration, and controlling the operation of the high voltage buck-boost converter and the low voltage buck-boost converter based on the operation of the bridge driver.

In some aspects, the techniques described herein relate to a method, wherein the operations further include: controlling the operation of the high voltage buck-boost converter and the low voltage buck-boost converter based on one or more of a voltage of a line voltage connected to the DC-DC converter, a battery connected to the DC-DC converter, or a power requirement of the DC-DC converter.

In some aspects, the techniques described herein relate to a method, wherein the operations further include: controlling an operation of one or more switches of the DC-DC converter to configure the DC-DC converter into each of (i) a charging mode with both an HV and LV buck operation, (ii) a charging mode with an LV only buck operation, (iii) an HV to LV conversion mode with HV and LV buck operation, (iv) an HV to LV conversion mode with HV only buck operation, and (v) an HV to LV conversion mode with no HV or LV buck operation.

In some aspects, the techniques described herein relate to a method, wherein the operations further include: controlling the operation of the high voltage buck-boost converter and the low voltage buck-boost converter to operate the DC-DC converter in a capacitor pre-charge operation.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Figure 1:
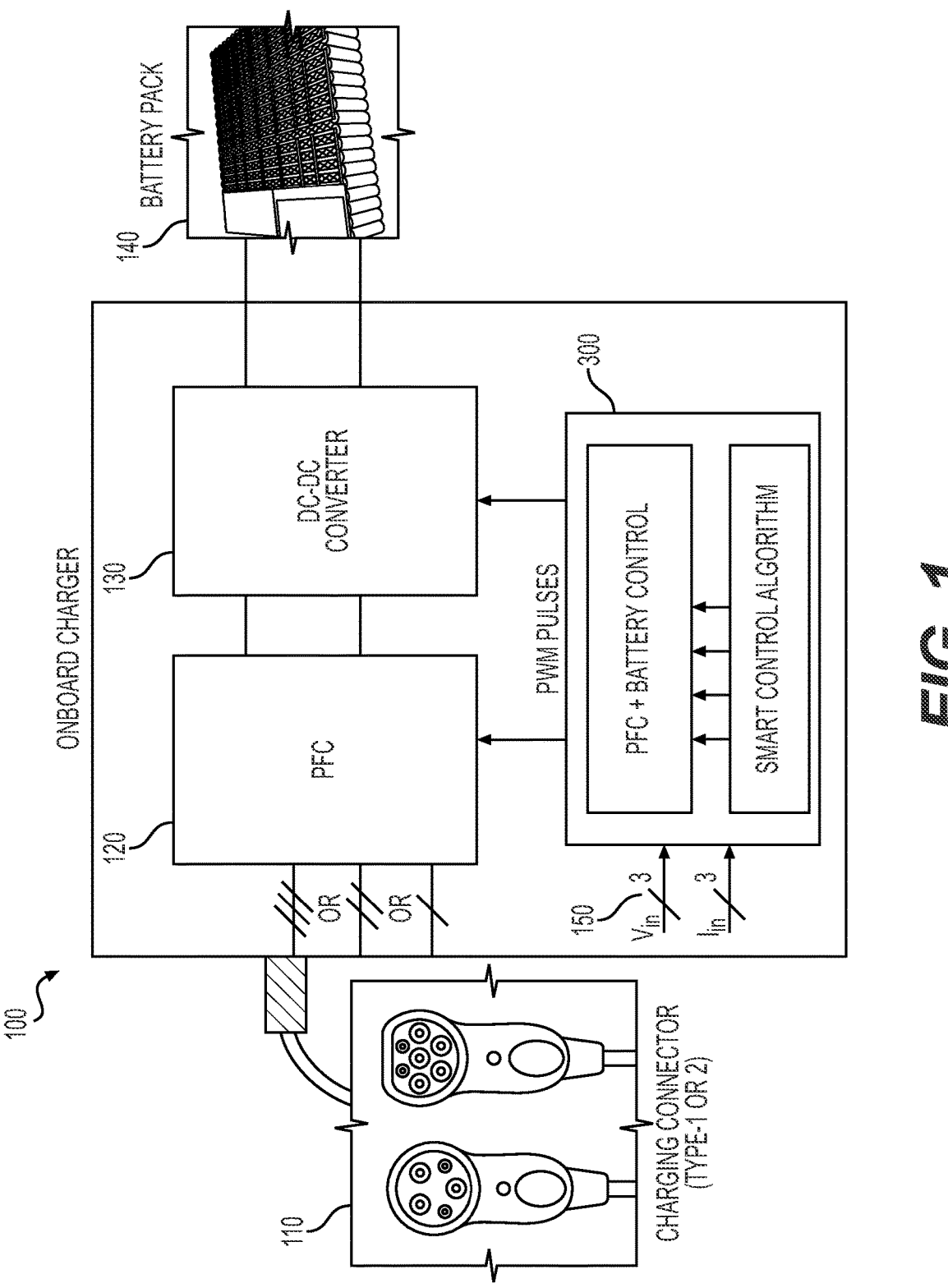
FIG. 1 depicts an exemplary system infrastructure for a battery charger, according to one or more embodiments.

Both the foregoing general description and the following detailed description are exemplary and explanatory only and are not restrictive of the features, as claimed. As used herein, the terms "comprises," "comprising," "has," "having,"

"includes," "including," or other variations thereof, are intended to cover a non-exclusive inclusion such that a process, method, article, or apparatus that comprises a list of elements does not include only those elements, but may include other elements not expressly listed or inherent to such a process, method, article, or apparatus. In this disclosure, unless stated otherwise, relative terms, such as, for example, "about," "substantially," and "approximately" are used to indicate a possible variation of ±10% in the stated value. In this disclosure, unless stated otherwise, any numeric value may include a possible variation of ±10% in the stated value.

Various embodiments of the present disclosure relate generally to systems and methods for a DC-DC converter including a configurable high voltage and low voltage connection, and a battery charger including the configurable DC-DC converter for electric vehicles.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section.

A battery charger according to the disclosure may operate with multiple types of alternating current (AC) input power supplies, including single phase, split/dual/two phase, and three-phase power supplies. The charger may be compatible with a wide range of configurations. An Inductor-Inductor-Capacitor (LLC) converter may be used as a second stage converter using a direct current (DC) link voltage generated from the Power Factor Correction (PFC) as the input voltage for the converter. However, the disclosure is not limited thereto.

The input and output layout of the charger may follow automotive standards. A battery charger according to the disclosure may include a two-stage configuration, including an AC-DC power factor correction converter stage and an isolated DC-DC converter stage. The isolated DC-DC converter may include a full-bridge driver configuration with resonant tank elements to achieve better efficiency. The DC-DC converter may be designed to charge the battery from minimum voltage to maximum voltage. The AC-DC converter may be one or more of a totem pole full bridge, AC-AC matrix, half-bridge (e.g. three legs and six switches), a three-level active neutral-point-clamped, Vienna rectifier, or T-type converter, for example. The DC-DC converter may be one or more of a phase shifted, dual active bridge, CLLLC, or LLC converter, for example.

A battery charger according to the disclosure may operate as a battery charger only, or operate bidirectionally for a charging operation or a power supply operation. The converter may either receive power from an AC power source and provide DC power to a battery, or receive power from the battery and provide power as an AC power source. A vehicle to grid (V2G) configuration may be achieved with a designed control strategy for single-phase, two-phase, and three-phase systems. Switches of the battery charger may be any devices, such as GTO, thyristors, or MOSFETs/IGBTs with series diodes, for example. These switches may also be mechanical components (such as relays or contactors) if sufficient failure rates and arcing conditions during operation are met. Additionally, if the switches are semi-permanent in position, the switches may be implemented as one or more jumper connectors or dual in-line package (DIP) switches.

Electric vehicles, energy storage systems, and backup generators, for example, convert electric power from one form to another. Additionally, an on-board charger for a vehicle, for example, may have a dual purpose. The on-board charger may be a bi-directional system that converts AC voltage to DC voltage in a charging mode (grid-to-battery) and DC voltage to AC voltage in a discharge or inverter mode (battery-to-grid). The charging mode may convert the grid AC into DC voltage to charge the vehicle high voltage (HV) battery, and the discharge or inverter mode may convert the HV battery DC voltage into AC voltage that may be supplied to a load of the grid line voltage, be supplied as a backup generator to power a house when the grid is down, or as an inverter to supply voltage to vehicle AC outlets, for example. The on-board charger may have a two-stage design to meet automotive requirements, with an AC-DC power factor converter in a first stage and an isolated DC-DC converter in a second stage.

An onboard charger may be designed with high power density, less weight, and less space requirements. An onboard charger may include a low voltage DC-DC converter to convert a high voltage (HV) to a low voltage (LV), for use by auxiliary circuits in an electric vehicle or plug-in hybrid electric vehicle, for example. A high voltage may be 400V or 800V, for example. A low voltage may be 12V or 48V, for example. A low voltage DC-DC converter may include a buck converter to charge an LV battery, for example. The buck converter may operate in a bi-directional manner as a buck-boost converter. The buck converter may operate as one or more of a buck, boost, isolated phase shifted, LLC half-bridge, or LLC full-bridge converter. An onboard charger may operate in different modes, such as pre-charging a bulk capacitor, for example. For a high power density design, a separation of HV and LV converters in an onboard charger may increase a component count, decrease an efficiency, and increase a cost of the onboard charger. One or more embodiments may provide an integrated HV-LV converter to address the above-stated problems and provide an efficient and flexible operation. One or more embodiments may configure a DC-DC converter to operate a transformer at an optimal resonance.

FIG. 1 depicts an exemplary system infrastructure for a battery charger, according to one or more embodiments. As shown in FIG. 1, a battery charger 100 may include or be electrically connectable to a charging connector 110. The charging connector 110 may provide an electrical connection from an external power supply to the battery charger 100, and may be a Type 1 or a Type 2 connector, for example. The charging connector 110 may transfer single phase, two-phase, or three phase power.

The battery charger 100 may include a Power Factor Correction (PFC) converter as PFC converter 120, a DC-DC converter 130, and a controller 300 receiving signals from input sensor 150. PFC converter 120 may be an AC-DC converter. Controller 300 may include one or more controllers. The battery charger 100 may include or be electrically connectable to a battery 140. The battery charger 100 may be used in automotive vehicles as an onboard charger to transfer power from an external power source through charging connector 110 to battery 140 in a grid-to-battery operation, or to transfer power from battery 140 in a vehicle to grid configuration (a battery-to-grid operation). The battery charger 100 may be included in a system provided as an electric vehicle including a motor configured to rotate based on power received from the battery 140.

Figure 2:
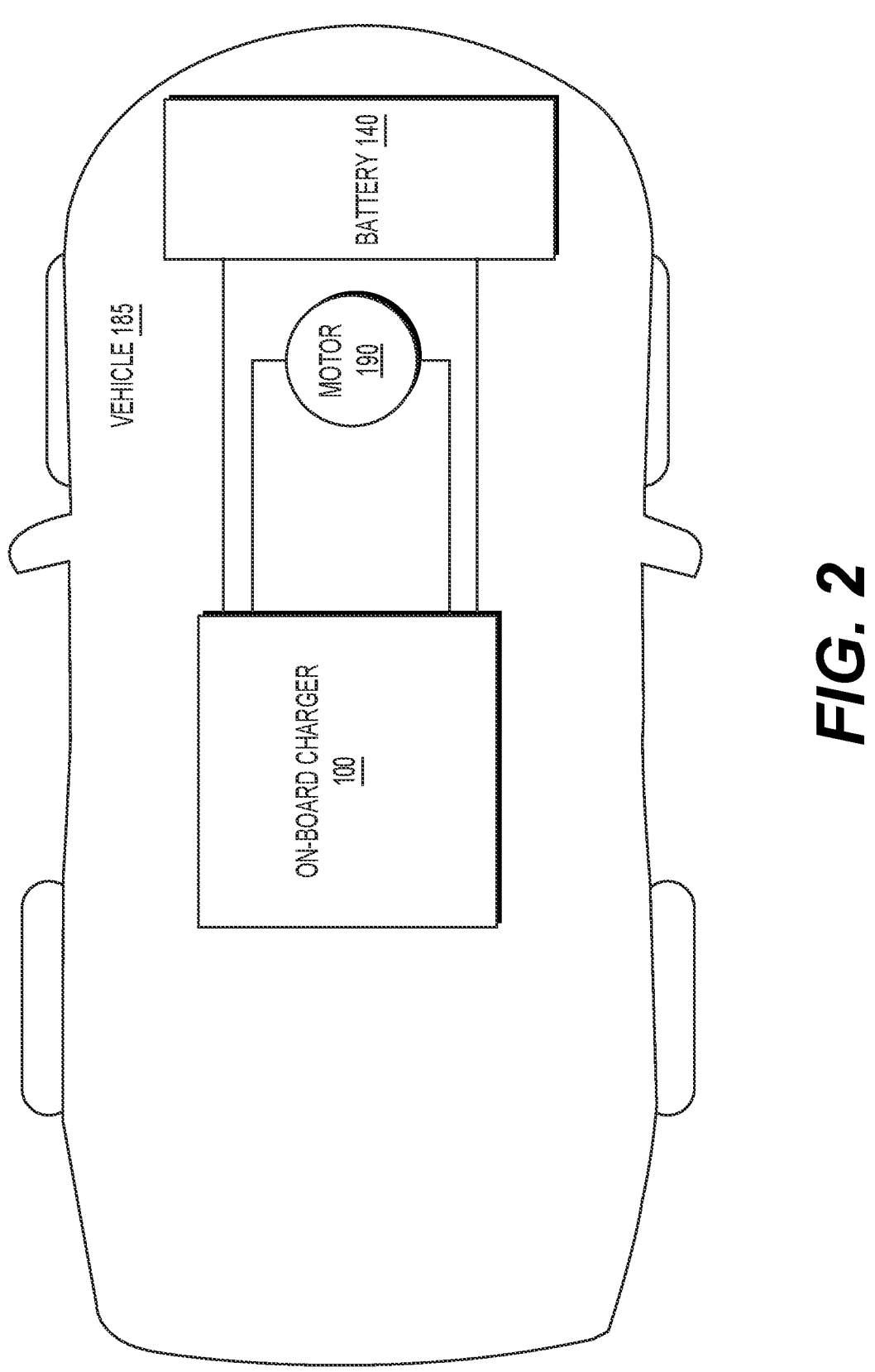
FIG. 2 depicts an exemplary system infrastructure for a vehicle including a battery charger, according to one or more embodiments.

FIG. 2 depicts an exemplary system infrastructure for a vehicle including a battery charger, according to one or more embodiments. The battery charger 100 may be a combined inverter and converter. As shown in FIG. 2, electric vehicle 185 may include battery charger 100, motor 190, and battery 140. Battery charger 100 may include components to receive electrical power from an external source and output electrical power to charge battery 140 of electric vehicle 185. Battery charger 100 may convert DC power from battery 140 in electric vehicle 185 to AC power, to drive motor 190 of the electric vehicle 185, for example, but the embodiments are not limited thereto. For example, battery charger 100 may include components to receive electrical power from an external source and output electrical power to charge battery 140 without motor 190 connected to battery charger 100. Battery charger 100 may convert DC power from battery 140 in electric vehicle 185 to AC power, to drive AC components other than motor 190 of the electric vehicle 185. Battery charger 100 may be bidirectional, and may convert DC power to AC power, or convert AC power to DC power, such as during regenerative braking, for example. Battery charger 100 may be a three-phase inverter, a single-phase inverter, or a multi-phase inverter.

Figure 3:
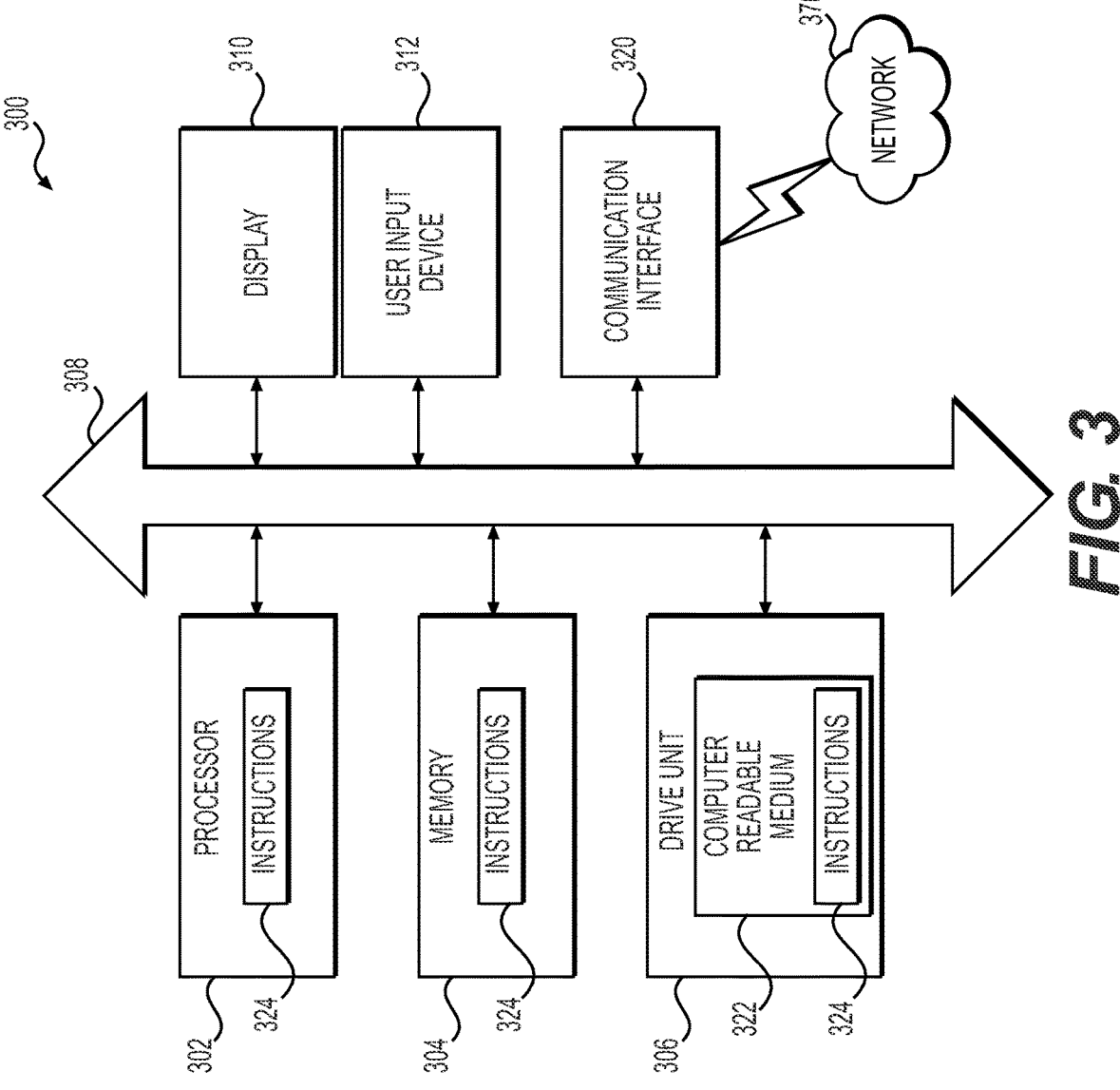
FIG. 3 depicts an implementation of a computer system that may execute techniques presented herein, according to one or more embodiments.

FIG. 3 depicts an implementation of a controller 300 that may execute techniques presented herein, according to one or more embodiments.

Any suitable system infrastructure may be put into place to allow control of the battery charger. FIG. 3 and the following discussion provide a brief, general description of a suitable computing environment in which the present disclosure may be implemented. In one embodiment, any of the disclosed systems, methods, and/or graphical user interfaces may be executed by or implemented by a computing system consistent with or similar to that depicted in FIG. 3. Although not required, aspects of the present disclosure are described in the context of computer-executable instructions, such as routines executed by a data processing device, e.g., a server computer, wireless device, and/or personal computer. Those skilled in the relevant art will appreciate that aspects of the present disclosure can be practiced with other communications, data processing, or computer system configurations, including: Internet appliances, hand-held devices (including personal digital assistants ("PDAs")), wearable computers, all manner of cellular or mobile phones (including Voice over IP ("VoIP") phones), dumb terminals, media players, gaming devices, virtual reality devices, multi-processor systems, microprocessor-based or programmable consumer electronics, set-top boxes, network PCs, mini-computers, mainframe computers, and the like. Indeed, the terms "computer," "server," and the like, are generally used interchangeably herein, and refer to any of the above devices and systems, as well as any data processor.

Aspects of the present disclosure may be embodied in a special purpose computer and/or data processor that is specifically programmed, configured, and/or constructed to perform one or more of the computer-executable instructions explained in detail herein. While aspects of the present disclosure, such as certain functions, are described as being performed exclusively on a single device, the present disclosure may also be practiced in distributed environments where functions or modules are shared among disparate processing devices, which are linked through a communications network, such as a Local Area Network ("LAN"), Wide Area Network ("WAN"), and/or the Internet. Similarly, techniques presented herein as involving multiple devices may be implemented in a single device. In a distributed computing environment, program modules may be located in both local and/or remote memory storage devices.

Aspects of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the Internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

The controller 300 may include a set of instructions that can be executed to cause the controller 300 to perform any one or more of the methods or computer-based functions disclosed herein. The controller 300 may operate as a standalone device or may be connected, e.g., using a network, to other computer systems or peripheral devices.

In a networked deployment, the controller 300 may operate in the capacity of a server or as a client in a server-client user network environment, or as a peer computer system in a peer-to-peer (or distributed) network environment. The controller 300 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular implementation, the controller 300 can be implemented using electronic devices that provide voice, video, or data communication. Further, while the controller 300 is illustrated as a single system, the term "system" shall also be taken to include any collection of systems or sub-systems that individually or jointly execute a set, or multiple sets, of instructions to perform one or more computer functions.

As illustrated in FIG. 3, the controller 300 may include a processor 302, e.g., a central processing unit (CPU), a graphics processing unit (GPU), or both. The processor 302 may be a component in a variety of systems. For example, the processor 302 may be part of a standard computer. The processor 302 may be one or more general processors, digital signal processors, application specific integrated circuits, field programmable gate arrays, servers, networks, digital circuits, analog circuits, combinations thereof, or other now known or later developed devices for analyzing and processing data. The processor 302 may implement a software program, such as code generated manually (i.e., programmed).

The controller 300 may include a memory 304 that can communicate via a bus 308. The memory 304 may be a main memory, a static memory, or a dynamic memory. The memory 304 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one implementation, the memory 304 includes a cache or random-access memory for the processor 302. In alternative implementations, the memory 304 is separate from the processor 302, such as a cache memory of a processor, the system memory, or other memory. The memory 304 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 304 is operable to store instructions executable by the processor 302. The functions, acts or tasks illustrated in the figures or described herein may be performed by the processor 302 executing the instructions stored in the memory 304. The functions, acts or tasks are independent of the particular type of instructions set, storage media, processor or processing strategy and may be performed by software, hardware, integrated circuits, firm-ware, micro-code and the like, operating alone or in combination. Likewise, processing strategies may include multiprocessing, multitasking, parallel processing and the like.

As shown, the controller 300 may further include a display 310, such as a liquid crystal display (LCD), an organic light emitting diode (OLED), a flat panel display, a solid-state display, a cathode ray tube (CRT), a projector, a printer or other now known or later developed display device for outputting determined information. The display 310 may act as an interface for the user to see the functioning of the processor 302, or specifically as an interface with the software stored in the memory 304 or in the drive unit 306.

Additionally or alternatively, the controller 300 may include an input device 312 configured to allow a user to interact with any of the components of controller 300. The input device 312 may be a number pad, a keyboard, or a cursor control device, such as a mouse, or a joystick, touch screen display, remote control, or any other device operative to interact with the controller 300.

The controller 300 may also or alternatively include drive unit 306 implemented as a disk or optical drive. The drive unit 306 may include a computer-readable medium 322 in which one or more sets of instructions (instructions 324), e.g. software, can be embedded. Further, the instructions 324 may embody one or more of the methods or logic as described herein. The instructions 324 may reside completely or partially within the memory 304 and/or within the processor 302 during execution by the controller 300. The memory 304 and the processor 302 also may include computer-readable media as discussed above.

In some systems, a computer-readable medium 322 includes instructions 324 or receives and executes instructions 324 responsive to a propagated signal so that a device connected to a network 370 can communicate voice, video, audio, images, or any other data over the network 370. Further, the instructions 324 may be transmitted or received over the network 370 via a communication port or interface 320, and/or using a bus 308. The communication port or interface 320 may be a part of the processor 302 or may be a separate component. The communication port or interface 320 may be created in software or may be a physical connection in hardware. The communication port or interface 320 may be configured to connect with a network 370, external media, the display 310, or any other components in controller 300, or combinations thereof. The connection with the network 370 may be a physical connection, such as a wired Ethernet connection or may be established wirelessly as discussed below. Likewise, the additional connections with other components of the controller 300 may be physical connections or may be established wirelessly. The network 370 may alternatively be directly connected to a bus 308.

While the computer-readable medium 322 is shown to be a single medium, the term "computer-readable medium" may include a single medium or multiple media, such as a centralized or distributed database, and/or associated caches and servers that store one or more sets of instructions. The term "computer-readable medium" may also include any medium that is capable of storing, encoding, or carrying a set of instructions for execution by a processor or that cause a computer system to perform any one or more of the methods or operations disclosed herein. The computer-readable medium 322 may be non-transitory, and may be tangible.

The computer-readable medium 322 can include a solid-state memory such as a memory card or other package that houses one or more non-volatile read-only memories. The computer-readable medium 322 can be a random-access memory or other volatile re-writable memory. Additionally or alternatively, the computer-readable medium 322 can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative implementation, dedicated hardware implementations, such as application specific integrated circuits, programmable logic arrays and other hardware devices, can be constructed to implement one or more of the methods described herein. Applications that may include the apparatus and systems of various implementations can broadly include a variety of electronic and computer systems. One or more implementations described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

The controller 300 may be connected to a network 370. The network 370 may define one or more networks including wired or wireless networks. The wireless network may be a cellular telephone network, an 802.11, 802.16, 802.20, or WiMAX network. Further, such networks may include a public network, such as the Internet, a private network, such as an intranet, or combinations thereof, and may utilize a variety of networking protocols now available or later developed including, but not limited to TCP/IP based networking protocols. The network 370 may include wide area networks (WAN), such as the Internet, local area networks (LAN), campus area networks, metropolitan area networks, a direct connection such as through a Universal Serial Bus (USB) port, or any other networks that may allow for data communication. The network 370 may be configured to couple one computing device to another computing device to enable communication of data between the devices. The network 370 may generally be enabled to employ any form of machine-readable media for communicating information from one device to another. The network 370 may include communication methods by which information may travel between computing devices. The network 370 may be divided into sub-networks. The sub-networks may allow access to all of the other components connected thereto or the sub-networks may restrict access between the components. The network 370 may be regarded as a public or private network connection and may include, for example, a virtual private network or an encryption or other security mechanism employed over the public Internet, or the like.

In accordance with various implementations of the present disclosure, the methods described herein may be implemented by software programs executable by a computer system. Further, in an exemplary, non-limited implementation, implementations can include distributed processing, component/object distributed processing, and parallel processing. Alternatively, virtual computer system processing can be constructed to implement one or more of the methods or functionality as described herein.

Although the present specification describes components and functions that may be implemented in particular implementations with reference to particular standards and protocols, the disclosure is not limited to such standards and protocols. For example, standards for Internet and other packet switched network transmission (e.g., TCP/IP, UDP/IP, HTML, and HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

It will be understood that the steps of methods discussed are performed in one embodiment by an appropriate processor (or processors) of a processing (i.e., computer) system executing instructions (computer-readable code) stored in storage. It will also be understood that the disclosure is not limited to any particular implementation or programming technique and that the disclosure may be implemented using any appropriate techniques for implementing the functionality described herein. The disclosure is not limited to any particular programming language or operating system.

Figure 4:
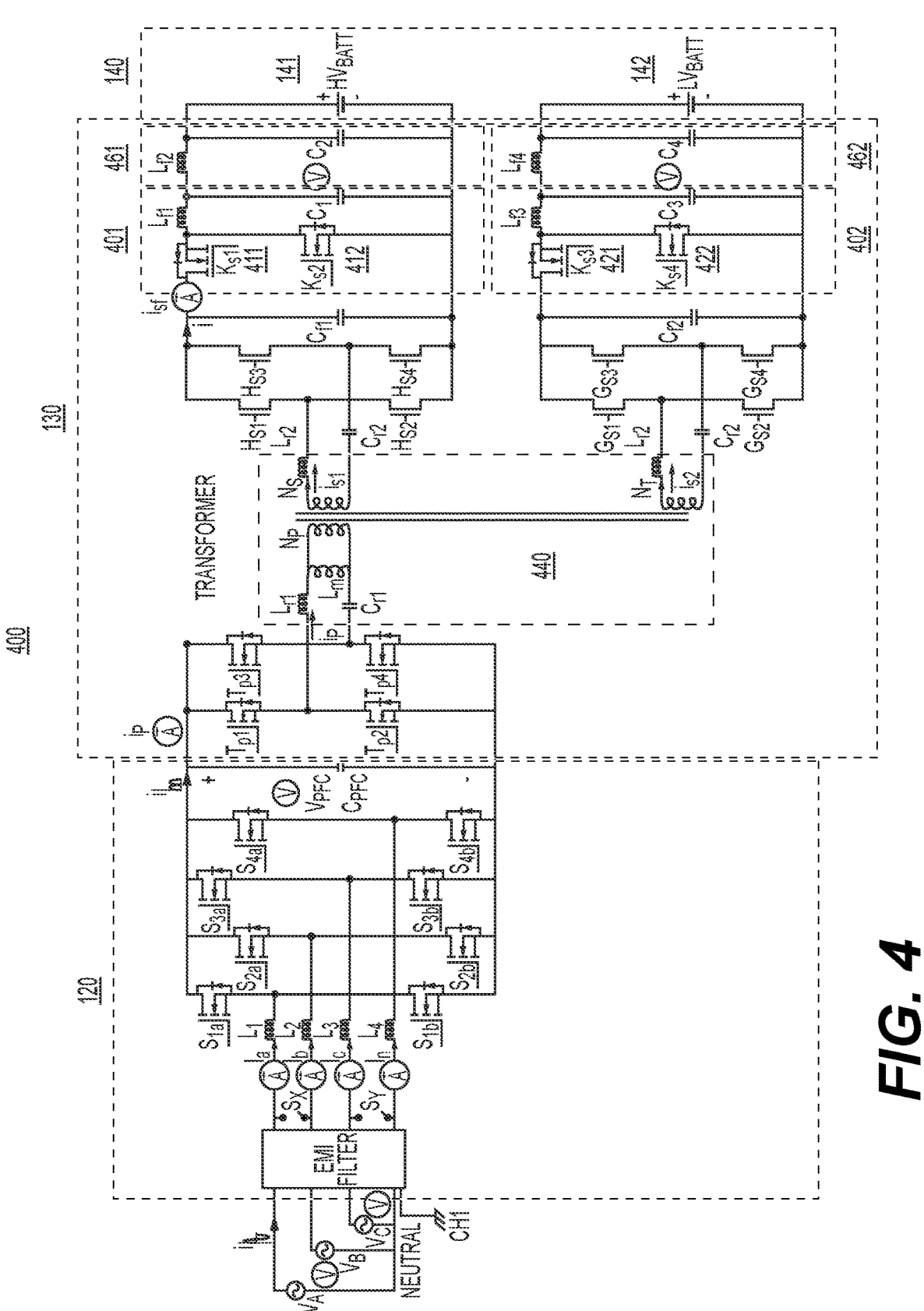
FIG. 4 depicts an exemplary electrical schematic for a battery charger with a configurable DC-DC converter in a charging mode with an HV and LV buck operation, according to one or more embodiments.

FIG. 4 depicts an exemplary electrical schematic for a battery charger with a configurable DC-DC converter in a charging mode with an HV and LV buck operation, according to one or more embodiments. As shown in FIG. 4, battery charger 100 may operate in a charging mode 400 with both a high voltage (HV) and low voltage (LV) buck operation.

Battery charger 100 may include PFC converter 120 and a DC-DC converter 130. PFC converter 120 may be an AC-DC converter. Battery charger 100 may include or be electrically connectable to battery 140. DC-DC converter 130 may include HV buck converter 401, LV buck converter 402, HV filter 461, and LV filter 462. Battery 140 may include HV battery 141 and LV battery 142.

As shown in FIG. 4, the PFC converter 120 according to the disclosure may operate with a three-phase input. However, PFC converter 120 may also operate with a two-phase or single-phase input. PFC converter 120 may include inductors L1, L2, L3, and L4 provided on phases A, B, and C, and a neutral leg, respectively. Capacitor $C_{PFC}$ may be provided as a DC link capacitor at an output of PFC converter 120 with a voltage $V_{PFC}$ to an input of DC-DC converter 130. DC-DC converter 130 may be operable to isolate the PFC converter 120 from battery 140. For example, DC-DC converter 130 may be a CLLLC converter, or any suitable DC-DC converter.

The battery charger 100 may be a system including PFC converter 120. PFC converter 120 may include a first (e.g. A) phase switch group (e.g. switches S1a and S1b) connected to a first node to receive power from a first phase of a voltage source (e.g. $V_A$). The system may include a second (e.g. B) phase switch group (e.g. switches S2a and S2b) connected to a second node to receive power from a second phase of a voltage source (e.g. $V_B$). The system may include a third (e.g. C) phase switch group (e.g. switches S3a and S3b) connected to a third node to receive power from a third phase of a voltage source (e.g. $V_C$). The system may include a neutral phase switch group (e.g. switches S4a and S4b) connected to a fourth node to provide a neutral return path to the voltage source or create a virtual neutral when operated in a line-to-line input. The battery charger 100 may include a controller 300 (see FIG. 3) configured to control an operation of the first, second, and third phase switch groups (e.g. S1a and S1b, S2a and S2b, S3a and S3b, and S4a and S4b).

DC-DC converter 130 may be connected to outputs of the first, second, third, and neutral phase switch groups. A voltage source may be connected to one or more of the first, second, third, and neutral nodes of the PFC converter 120, and a battery 140 may be connected to an output of the DC-DC converter 130. Additionally, HV filter 461 and LV filter 462 may be provided between the DC-DC converter 130 and battery 140, or as part of the DC-DC converter 130.

The battery charger 100 may operate bidirectionally. A vehicle to grid (V2G) operation may be achieved with a designed control strategy for multiple voltages. The PFC converter 120 may be configured to receive DC power from the battery 140 through the DC-DC converter 130, convert the DC power to AC power, and provide the AC power through one or more of the first, second, and third nodes. The controller 300 may be designed with an algorithm to control an operation of the first, second, third, and neutral phase switch groups to provide the AC power through the one or more of the first, second, third, and fourth nodes.

DC-DC converter 130 may include a bridge driver, an HV bridge rectifier, and an LV bridge rectifier. The bridge driver may include first switch Tp1, second switch Tp2, third switch Tp3, and fourth switch Tp4. The bridge driver may be operated as a full-bridge driver or a half-bridge driver, and transmit power as a square-wave signal from PFC converter 120 to transformer 440. Transformer 440 may be one or more high-frequency transformers and may be a single transformer with multiple coils or windings, multiple transformers with single coils or windings, or any combination thereof. The HV bridge rectifier may include first switch Hs1, second switch Hs2, third switch Hs3, and fourth switch Hs4. The LV bridge rectifier may include first switch Gs1, second switch Gs2, third switch Gs3, and fourth switch Gs4. The switches of the HV bridge rectifier and the LV bridge rectifier may convert the square-wave signal to DC power.

HV buck converter 401 may include first HV switch 411 and second HV switch 412. LV buck converter 402 may include first LV switch 421 and second LV switch 422. HV buck converter 401 may operate to control a voltage conversion to and from HV battery 141. For example, HV buck converter 401 may convert a 400V input to a 300V output to HV battery 141, and vice versa. LV buck converter 402 may operate to control a voltage conversion to and from LV battery 142. For example, LV buck converter 402 may convert a 48V input to a 12V output to LV battery 142, and vice versa.

As shown in FIG. 4, in a charging mode 400 with both an HV and LV buck operation to convert a voltage from VA, VB, and VC, for example, controller 300 may operate first HV switch 411 and second HV switch 412 to convert the voltage to charge HV battery 141, and operate first LV switch 421 and second LV switch 422 to convert the voltage to charge LV battery 142.

Figure 5:
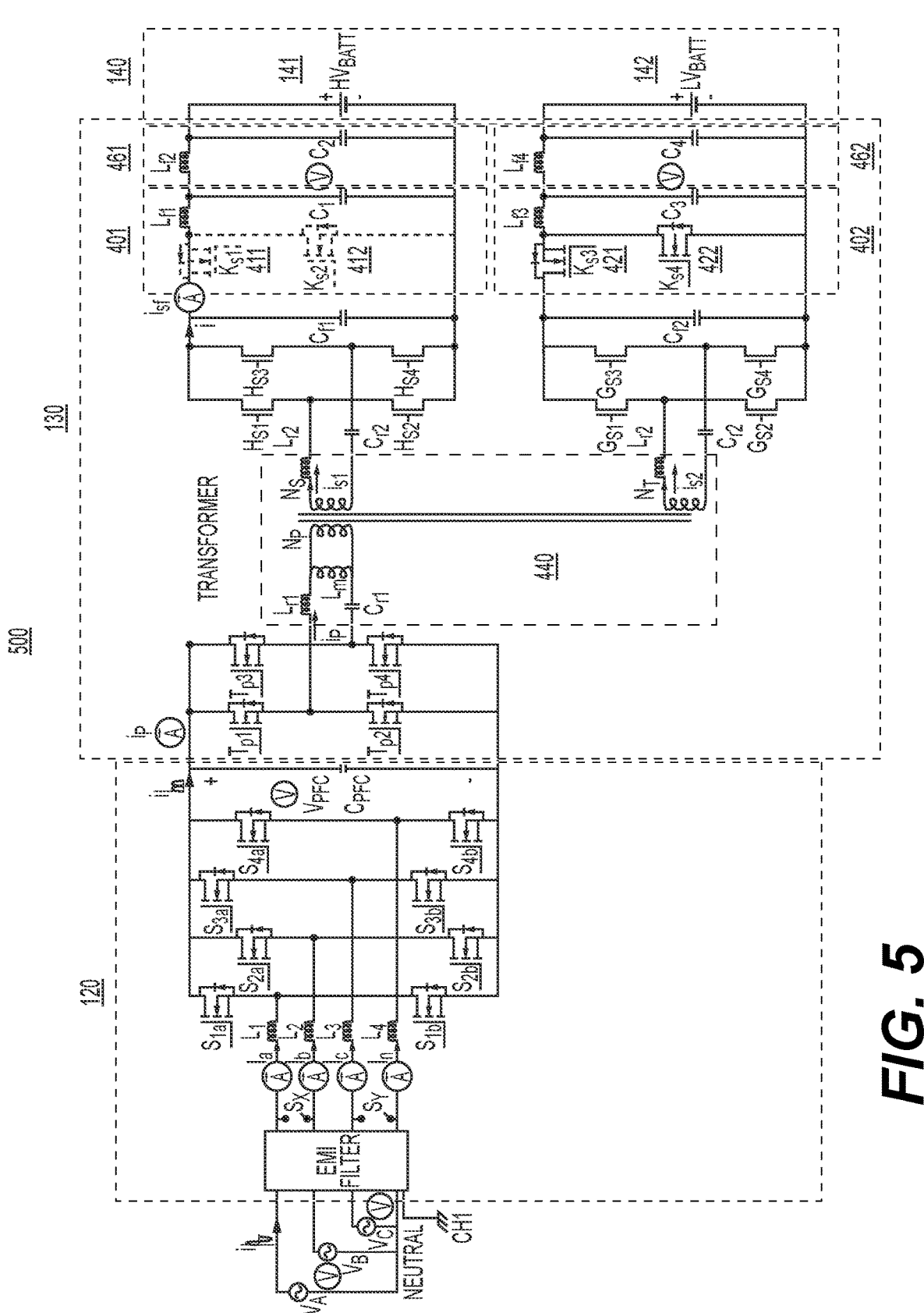
FIG. 5 depicts an exemplary electrical schematic for a battery charger with a configurable DC-DC converter in a charging mode with an LV only buck operation, according to one or more embodiments.

FIG. 5 depicts an exemplary electrical schematic for a battery charger with a configurable DC-DC converter in a charging mode with an LV only buck operation, according to one or more embodiments. As shown in FIG. 5, battery charger 100 may operate in a charging mode 500 with an LV only buck operation. For example, in some operating conditions, when the input to HV buck converter 401 (e.g. 400V) and the HV battery 141 (e.g. 400V) are the same, then the HV buck converter 401 may be operated as an LC filter to remove high-frequency content.

As shown in FIG. 5, in a charging mode 500 with an LV only buck operation to convert a voltage from VA, VB, and VC, for example, controller 300 may perform operations including closing (e.g. duty cycle of 100%) first HV switch 411 and opening (e.g. duty cycle of 0%) second HV switch 412 to operate HV buck converter 401 as an LC filter and pass, without conversion, a voltage to charge HV battery 141, and operate first LV switch 421 and second LV switch 422 to convert the voltage to charge LV battery 142.

Figure 6:
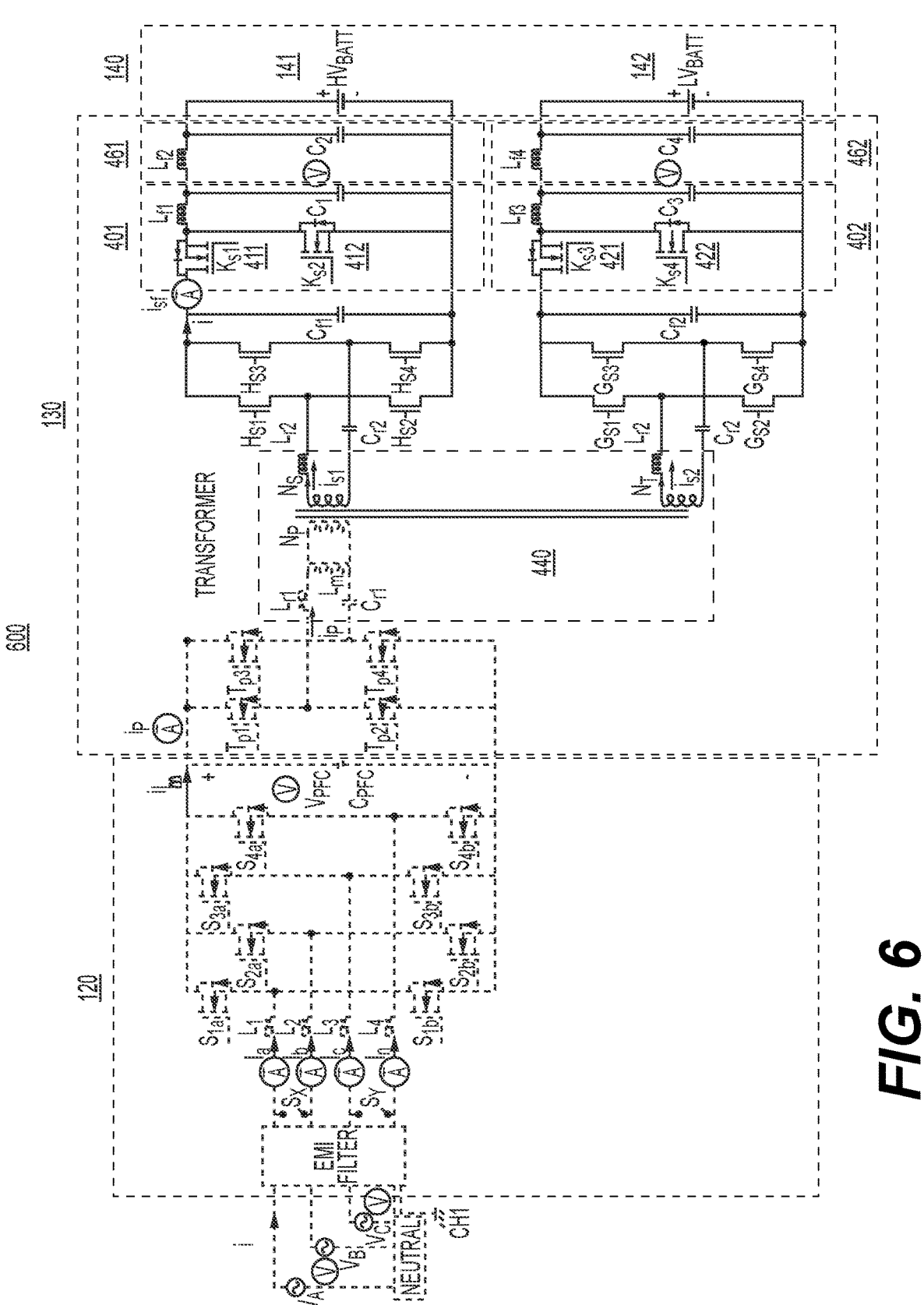
FIG. 6 depicts an exemplary electrical schematic for a battery charger with a configurable DC-DC converter in an HV to LV conversion mode with HV and LV buck operation, according to one or more embodiments.

FIG. 6 depicts an exemplary electrical schematic for a battery charger with a configurable DC-DC converter in an HV to LV conversion mode with HV and LV buck operation, according to one or more embodiments. As shown in FIG. 6, battery charger 100 may operate in an HV to LV conversion mode 600 with both HV and LV buck operation. For example, battery charger 100 may operate in an HV to LV conversion mode 600 when the AC charging is turned off. During this conversion, controller 300 may open primary transformer isolation switch 1101 (see FIG. 11) to isolate capacitor $C_{PFC}$.

As shown in FIG. 6, in an HV to LV conversion mode 600 with both HV and LV buck operation, for example, controller 300 may operate first HV switch 411 and second HV switch 412 to convert a voltage (e.g. 450V) from HV battery 141, and operate first LV switch 421 and second LV switch 422 to further convert (e.g. to 12V) the converted voltage from HV battery 141 to charge LV battery 142.

Figure 7:
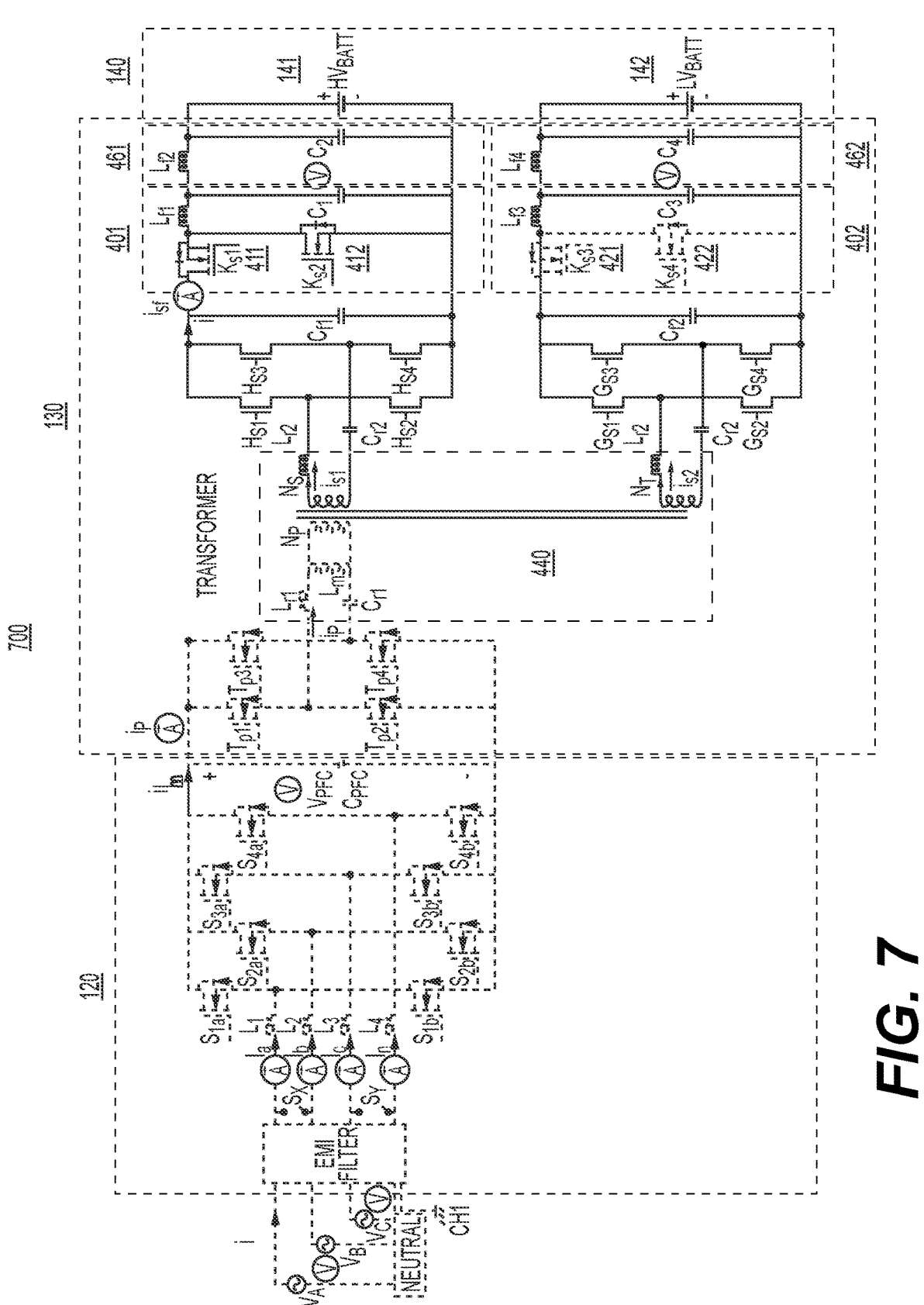
FIG. 7 depicts an exemplary electrical schematic for a battery charger with a configurable DC-DC converter in an HV to LV conversion mode with HV only buck operation, according to one or more embodiments.

FIG. 7 depicts an exemplary electrical schematic for a battery charger with a configurable DC-DC converter in an HV to LV conversion mode with HV only buck operation, according to one or more embodiments. As shown in FIG. 7, battery charger 100 may operate in an HV to LV conversion mode 700 with HV only buck operation.

As shown in FIG. 7, in an HV to LV conversion mode 700 with HV only buck operation, for example, controller 300 may operate first HV switch 411 and second HV switch 412 to convert a voltage from HV battery 141, and perform operations including closing first LV switch 421 and opening second LV switch 422 to pass, without further conversion, the converted voltage from HV battery 141 to charge LV battery 142.

Figure 8:
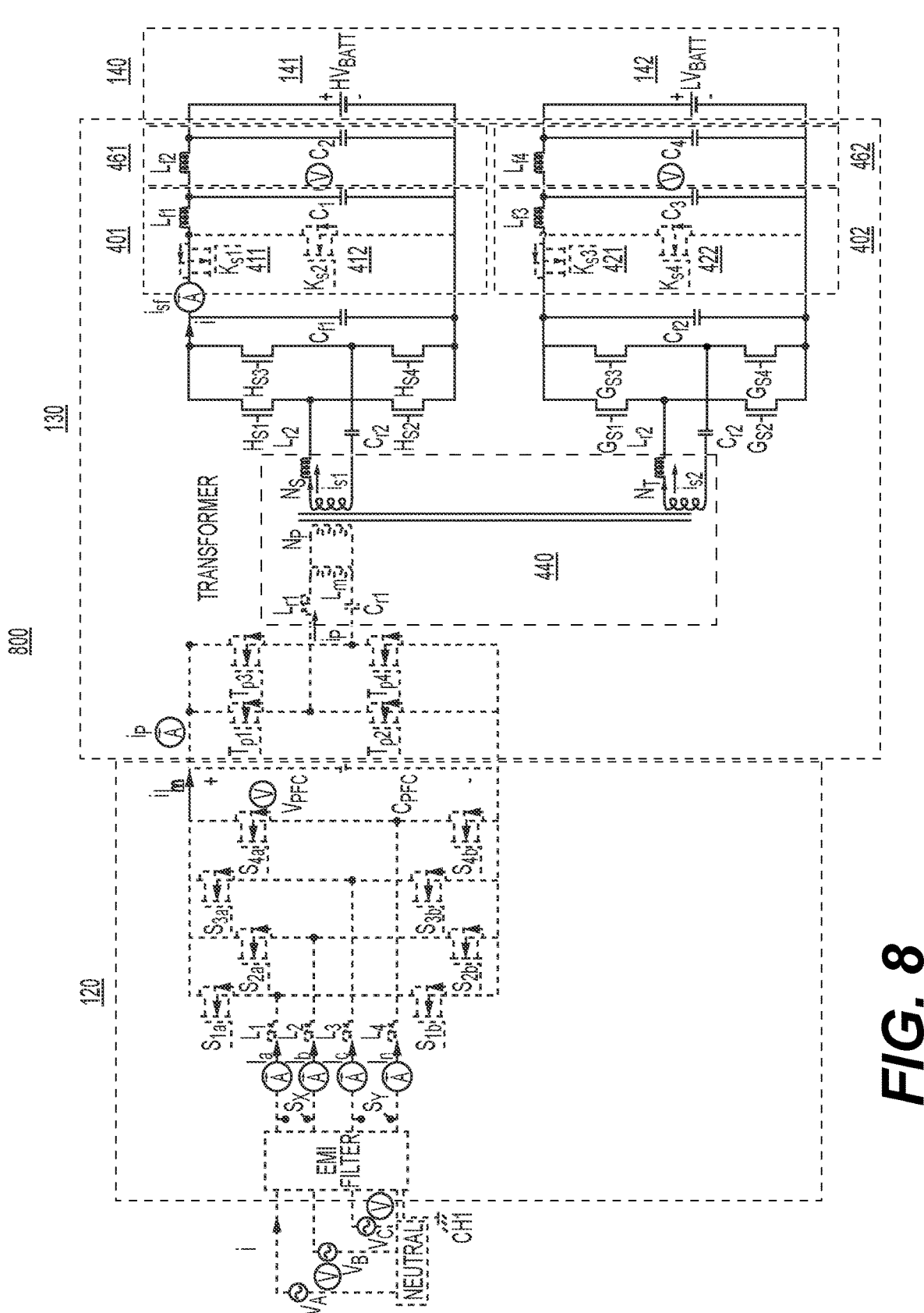
FIG. 8 depicts an exemplary electrical schematic for a battery charger with a configurable DC-DC converter in an HV to LV conversion mode with no HV or LV buck operation, according to one or more embodiments.

FIG. 8 depicts an exemplary electrical schematic for a battery charger with a configurable DC-DC converter in an HV to LV conversion mode with no HV or LV buck operation, according to one or more embodiments. As shown in FIG. 8, battery charger 100 may operate in an HV to LV conversion mode 800 with no HV or LV buck operation.

As shown in FIG. 8, in an HV to LV conversion mode 800 with no HV or LV buck operation, for example, controller 300 may perform operations including closing first HV switch 411 and opening second HV switch 412 to pass, without conversion, a voltage from HV battery 141, and perform operations including closing first LV switch 421 and opening second LV switch 422 to pass, without conversion, the voltage from HV battery 141 to charge LV battery 142. Here, the secondary side of a transformer, such as transformer 1040A or transformer 1040B, for example, may convert a voltage from HV battery 141 to charge LV battery 142.

Figure 9:
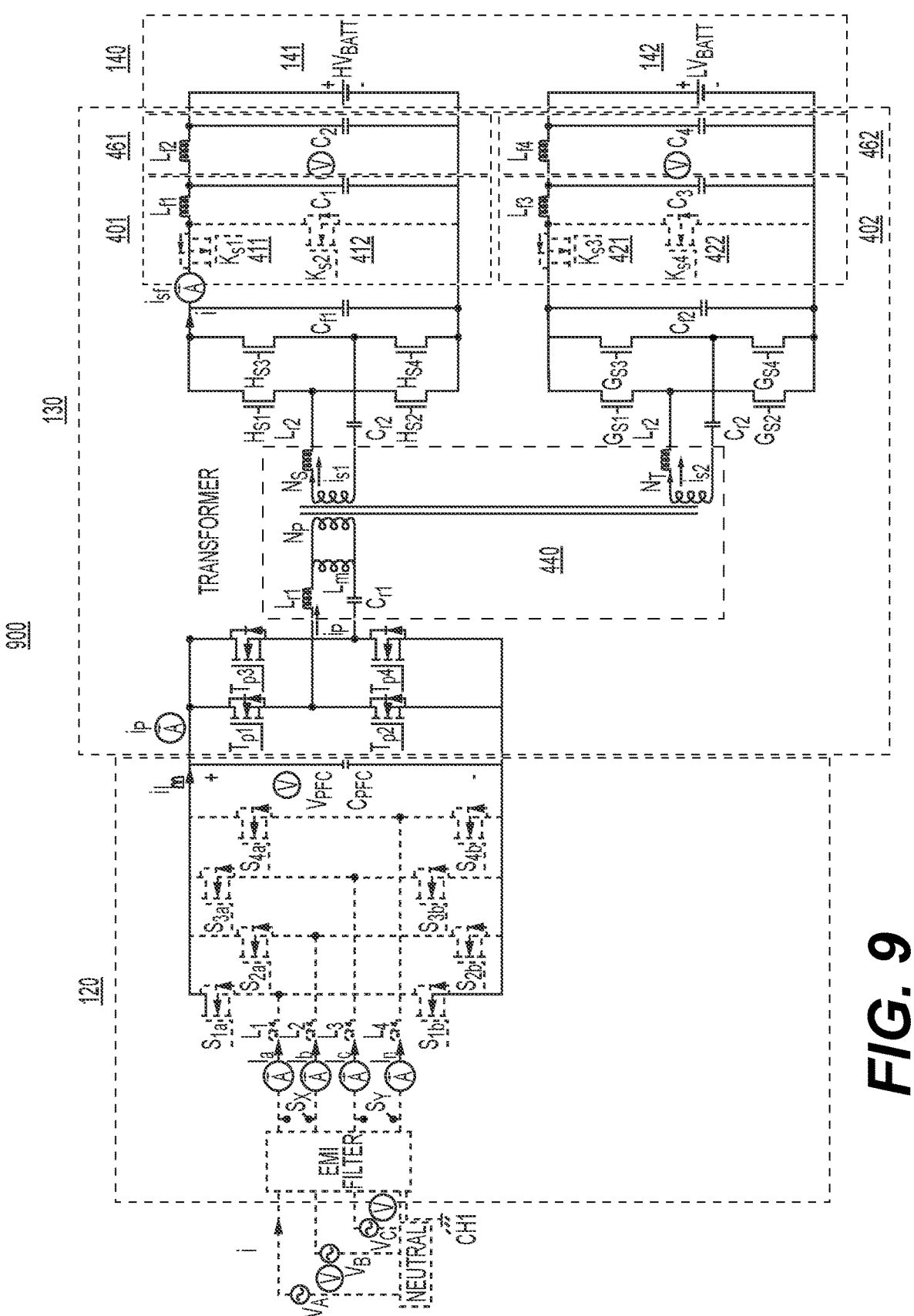
FIG. 9 depicts an exemplary electrical schematic for a battery charger with a configurable DC-DC converter in a capacitor pre-charge operation and an HV to LV conversion with no HV or LV buck operation, according to one or more embodiments.

FIG. 9 depicts an exemplary electrical schematic for a battery charger with a configurable DC-DC converter in a capacitor pre-charge operation and an HV to LV conversion with no HV or LV buck operation, according to one or more embodiments. As shown in FIG. 9, battery charger 100 may operate in a capacitor pre-charge operation 900 and an HV to LV conversion with no HV or LV buck operation.

As shown in FIG. 9, in an HV to LV conversion mode with no HV or LV buck operation, for example, controller 300 may perform operations including closing first HV switch 411 and opening second HV switch 412 to pass, without conversion, a voltage from HV battery 141, and perform operations including closing first LV switch 421 and opening second LV switch 422 to pass, without conversion, the voltage from HV battery 141 to charge LV battery 142. Here, the secondary side of a transformer, such as transformer 1040A or transformer 1040B, for example, may convert a voltage from HV battery 141 to charge LV battery 142. Additionally, the primary side of the transformer may convert a voltage from one or more of HV battery 141 and LV battery 142 to pre-charge a capacitor, such as capacitor $C_{PFC}$, for example. Battery charger 100 may also operate with either HV or LV boost operation, for example, in a one-stage or multiple stage operation to pre-charge the HV bus to a desired voltage. For example, second LV switch 422 may be used to boost a voltage from LV battery 142 to increase a voltage of capacitor Cf2.

Figure 10:
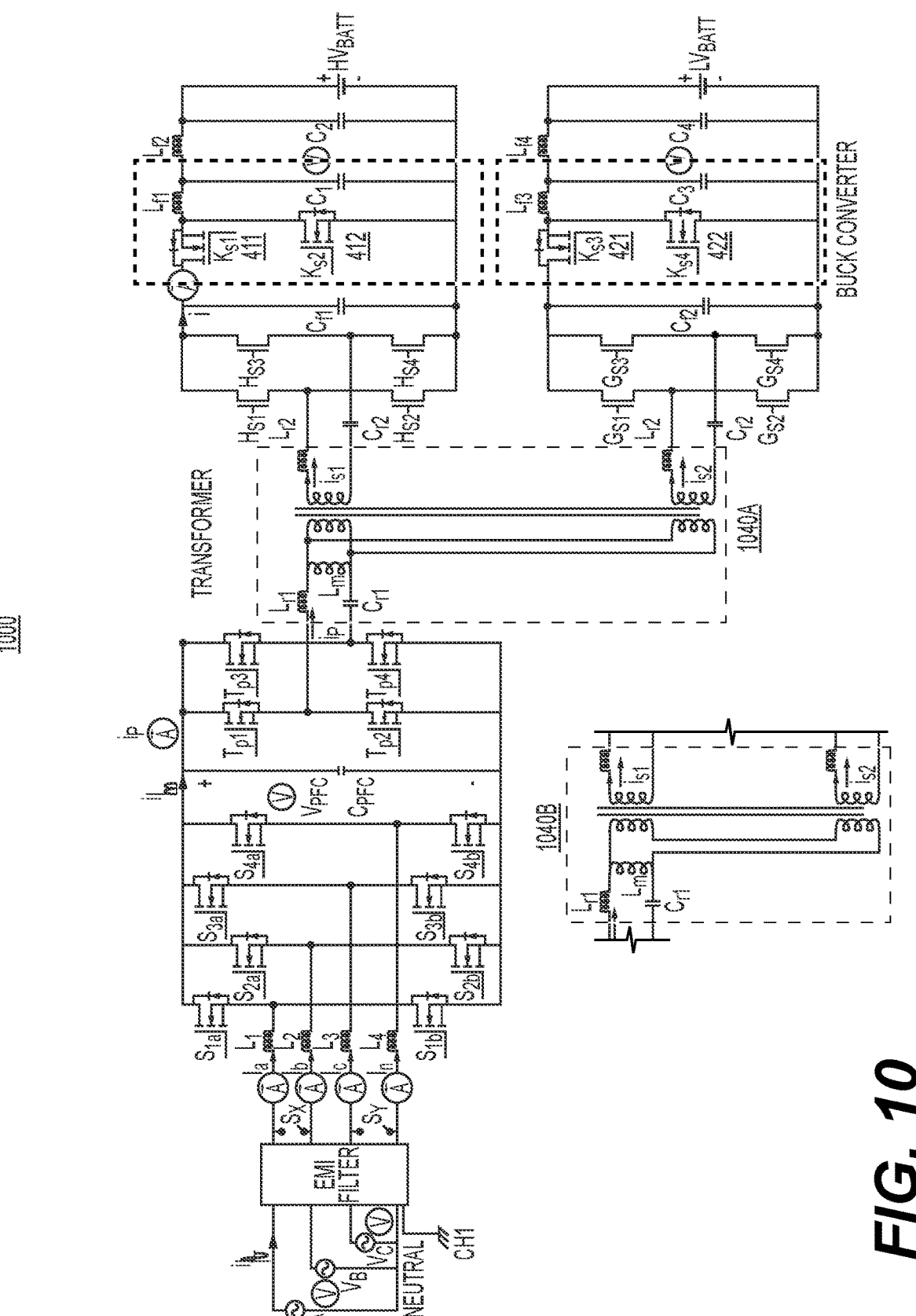
FIG. 10 depicts an exemplary electrical schematic for a battery charger with a configurable DC-DC converter alternatively including a series primary transformer or a parallel primary transformer, according to one or more embodiments.

FIG. 10 depicts an exemplary electrical schematic 1000 for a battery charger with a configurable DC-DC converter and alternatively including a series primary transformer or a parallel primary transformer, according to one or more embodiments. As shown in FIG. 10, battery charger 100 may include one or more of a transformer 1040A or transformer 1040B. Transformer 1040A may be a parallel primary transformer and transformer 1040B may be a series primary transformer. Transformer 1040A and transformer 1040B may be one or more high-frequency transformers and may be a single transformer with multiple coils or windings, multiple transformers with single coils or windings, or any combination thereof.

Figure 11:
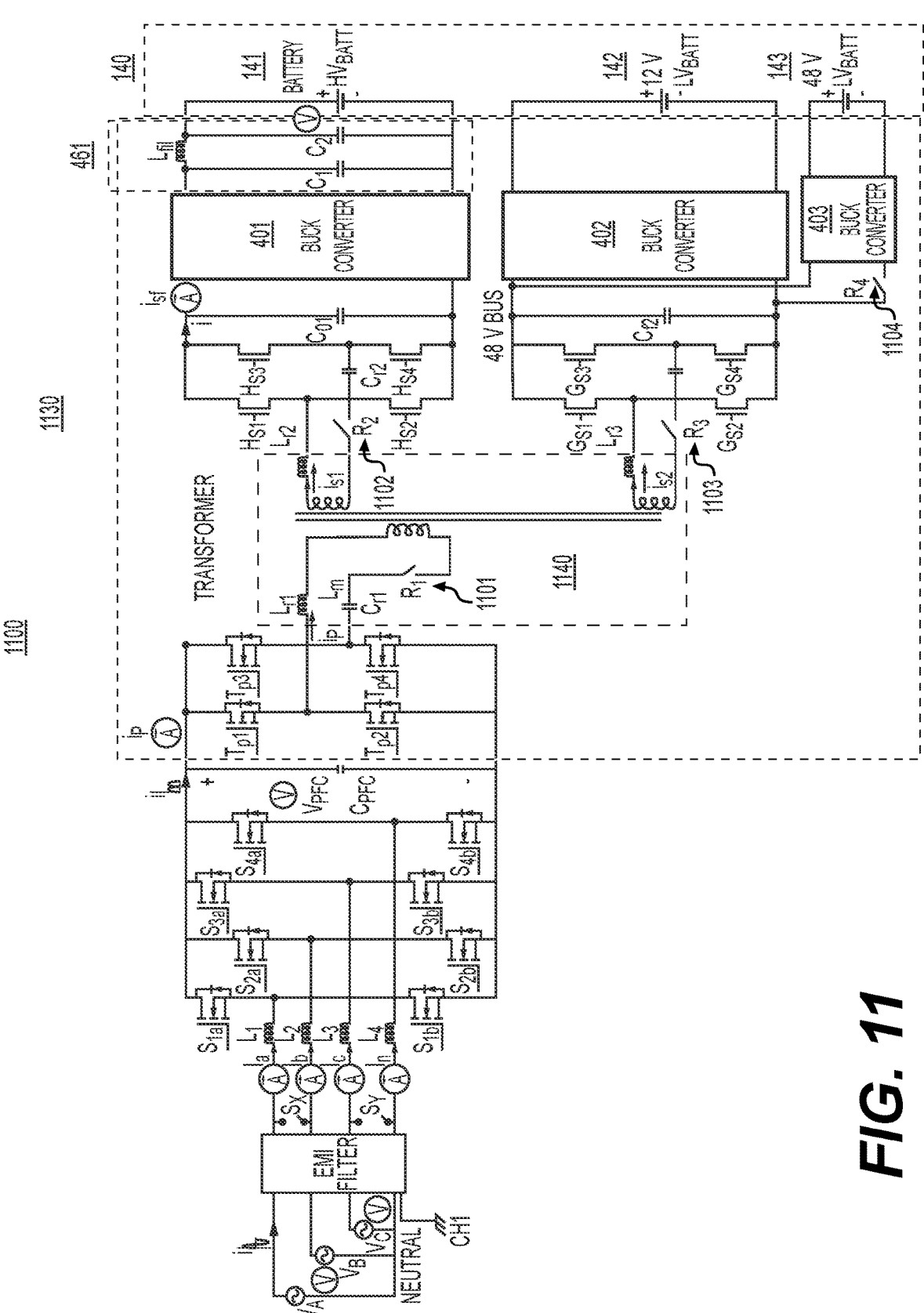
FIG. 11 depicts an exemplary electrical schematic for a battery charger with a configurable DC-DC converter including switches and connections for three batteries, according to one or more embodiments.

FIG. 11 depicts an exemplary electrical schematic 1100 for a battery charger with a configurable DC-DC converter including switches and connections for three batteries, according to one or more embodiments.

As shown in FIG. 11, battery charger 100 may include DC-DC converter 1130. DC-DC converter 1130 may include transformer 1140, HV buck converter 401, LV buck converter 402, and second LV buck converter 403. The second LV buck converter 403 may be connected to a tertiary side (or another secondary side) of transformer 1140. The second LV buck converter 403 may be referred to as a middle voltage buck converter. DC-DC converter 1130 may include one or more of primary transformer isolation switch 1101, HV isolation switch 1102, first LV isolation switch 1103, or second LV isolation switch 1104. Battery 140 may include HV battery 141, LV battery 142, and LV battery 143. HV battery 141 may be a 400V battery, LV battery 142 may be a 12V battery, and LV battery 143 may be a 48V battery, for example. LV battery 143 may be referred to as a middle voltage battery. Alternatively, second LV buck converter 403 may be omitted, so that LV battery 143 is connected directly in parallel with LV buck converter 402. For example, when the primary side of LV buck converter 402 is 48V and LV battery 143 is a 48V battery, second LV buck converter 403 may be omitted, or may be operated as an LC filter.

Controller 300 may operate one or more of primary transformer isolation switch 1101, HV isolation switch 1102, first LV isolation switch 1103, or second LV isolation switch 1104. For example, controller 300 may open primary transformer isolation switch 1101 to disconnect a primary side of transformer 1140, to thereby disconnect a voltage from VA, VB, and VC, for example, in HV to LV conversion mode 800 with no HV or LV buck operation. For example, controller 300 may open HV isolation switch 1102 to disconnect a voltage from HV battery 141. For example, controller 300 may open first LV isolation switch 1103 to disconnect a voltage from LV battery 142. For example, controller 300 may open second LV isolation switch 1104 to disconnect a voltage from LV battery 143. Controller 300 may operate one or more of primary transformer isolation switch 1101, HV isolation switch 1102, first LV isolation switch 1103, or second LV isolation switch 1104 based on a fault status of one or more of the PFC converter 120, HV buck converter 401, LV buck converter 402, or second LV buck converter 403. Controller 300 may operate one or more of primary transformer isolation switch 1101, HV isolation switch 1102, first LV isolation switch 1103, or second LV isolation switch 1104 based on a fault status to avoid a short condition, for example.

Figure 12:
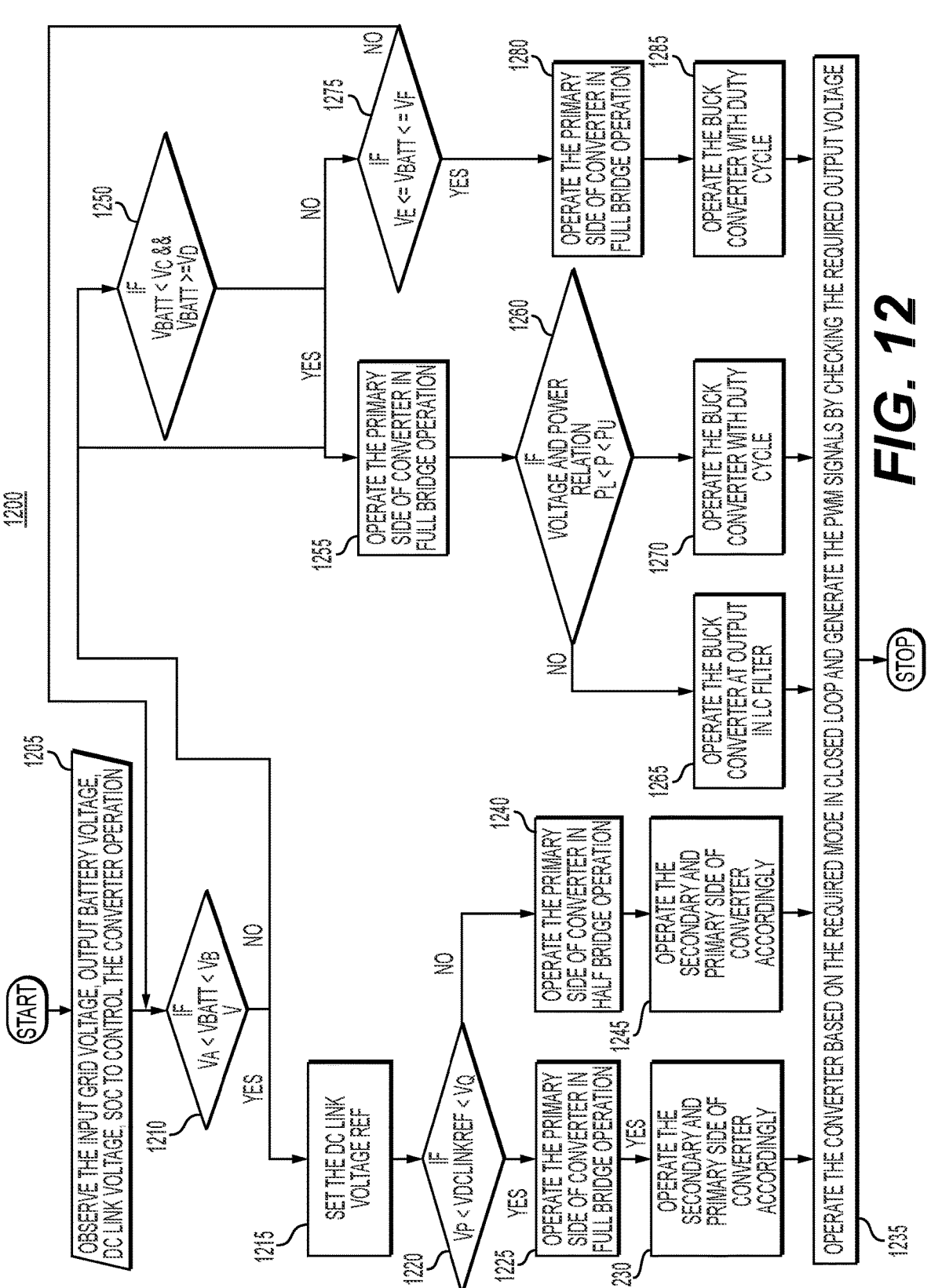
FIG. 12 depicts a flowchart of a method of operating a battery charger with a configurable DC-DC converter, according to one or more embodiments.

FIG. 12 depicts a flowchart of a method of operating a battery charger with a configurable DC-DC converter, according to one or more embodiments. Controller 300, for example, may perform method 1200. Method 1200 may include receiving input parameters including one or more of an input voltage, a battery voltage, or a DC link voltage, for example (operation 1205). Method 1200 may include determining whether a battery voltage is within a first voltage range (operation 1210). When the battery voltage is determined to be within a first voltage range, method 1200 may include setting a DC link voltage reference (operation 1215).

Method 1200 may include determining whether the DC link voltage is within a second voltage range (operation 1220). When the DC link voltage is determined to be within a second voltage range, method 1200 may include operating a primary side in a full bridge operation (operation 1225). Method 1200 may include operating a secondary side in accordance with the full bridge operation (operation 1230). Method 1200 may include generating a PWM signal based on a required output voltage and returning to a start of method 1200 at operation 1205 (operation 1235).

When the DC link voltage is determined not to be within a second voltage range, method 1200 may include operating a primary side in a half-bridge operation (operation 1240). Method 1200 may include operating a secondary side in accordance with the half-bridge operation (operation 1245). Method 1200 may include generating a PWM signal based on a required output voltage and returning to a start of method 1200 at operation 1205 (operation 1235).

When the battery voltage is determined not to be within a first voltage range, method 1200 may include determining whether the battery voltage is outside a third voltage range (operation 1250). When the battery voltage is determined to be outside the third voltage range, method 1200 may include operating a primary side in a full bridge operation (operation 1255). Method 1200 may include determining whether a power requirement is within a power range (operation 1260). When the power requirement is determined not to be within a power range, method 1200 may include operating a buck converter as a pass-through voltage converter (operation 1265). When the power requirement is determined to be within a power range, method 1200 may include operating a buck converter with a duty cycle (operation 1270). Method 1200 may include generating a PWM signal based on a required output voltage and returning to a start of method 1200 at operation 1205 (operation 1235).

When the battery voltage is determined not to be outside the third voltage range, method 1200 may include determining whether the battery voltage is within a fourth voltage range (operation 1275). When the battery voltage is determined not to be within a fourth voltage range, method 1200 may include returning to a start of method 1200 at operation 1205. When the battery voltage is determined to be within a fourth voltage range, method 1200 may include operating a primary side in a full bridge operation (operation 1280). Method 1200 may include operating a buck converter with a duty cycle (operation 1285). Method 1200 may include generating a PWM signal based on a required output voltage and returning to a start of method 1200 at operation 1205 (operation 1235).

An onboard charger may be designed with high power density, less weight, and less space requirements. An onboard charger may include a low voltage DC-DC converter to convert a high voltage (HV) to a low voltage (LV), for use by auxiliary circuits in an electric vehicle or plug-in hybrid electric vehicle, for example. A high voltage may be 400V or 800V, for example. A low voltage may be 12V or 48V, for example. A low voltage DC-DC converter may include a buck converter to charge an LV battery, for example. The buck converter may operate in a bi-directional manner as a buck-boost converter. An onboard charger may operate in different modes, such as pre-charging a bulk capacitor, for example. For a high power density design, a separation of HV and LV converters in an onboard charger may increase a component count, decrease an efficiency, and increase a cost of the onboard charger. One or more embodiments may provide an integrated HV-LV converter to address the above-stated problems and provide an efficient and flexible operation. One or more embodiments may configure a DC-DC converter to operate a transformer at an optimal resonance.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A system comprising:
   an alternating current (AC) to direct current (DC) converter (AC-DC converter), the AC-DC converter connectable to a line voltage;
   a DC to DC converter (DC-DC converter) connected to the AC-DC converter, the DC-DC converter including:
   a high voltage buck-boost converter having a secondary side connectable to a high voltage battery, the high voltage buck-boost converter including a first high voltage switch and a second high voltage switch, wherein the high voltage buck-boost converter is configured to operate in one or more modes, including at least one mode of the one or more modes where the first high voltage switch is configured to be in an open/closed state that is different from an open/closed state of the second high voltage switch;
   a low voltage buck-boost converter having a secondary side connectable to a low voltage battery, the low voltage buck-boost converter including a first low voltage switch and a second low voltage switch, wherein the low voltage buck-boost converter is configured to operate in one or more modes, including at least one mode of the one or more modes where the first low voltage switch is configured to be in an open/closed state that is different from an open/closed state of the second low voltage switch; and one or more transformers having a primary side connected to the AC-DC converter, a secondary side connected to a primary side of the high voltage buck-boost converter, and a tertiary side connected to a primary side of the low voltage buck-boost converter; and one or more controllers configured to control an operation of the high voltage buck-boost converter and the low voltage buck-boost converter to control a power transfer between two or more of the line voltage, the high voltage battery, or the low voltage battery;

wherein the one or more controllers control an operation of the first high voltage switch, the second high voltage switch, the first low voltage switch, and the second low voltage switch to configure the DC-DC converter into each of (i) a charging mode with both an HV and LV buck operation, (ii) a charging mode with an LV only buck operation, wherein the first high voltage switch is in the closed state and the second high voltage switch is in the open state, (iii) an HV to LV conversion mode with HV and LV buck operation, (iv) an HV to LV conversion mode with HV only buck operation, wherein the first low voltage switch is in the closed state and the second low voltage switch is in the open state, and (v) an HV to LV conversion mode with no HV or LV buck operation, wherein the first high voltage switch is in the closed state, the second high voltage switch is in the open state, the first low voltage switch is in the closed state, and the second low voltage switch is in the open state.

2. The system of claim 1, wherein the DC-DC converter further includes:

a high voltage bridge rectifier connected to the secondary side of the one or more transformers and the primary side of the high voltage buck-boost converter; and a low voltage bridge rectifier connected to the tertiary side of the one or more transformers and the primary side of the low voltage buck-boost converter.

3. The system of claim 1, wherein the one or more controllers are further configured to operate the DC-DC converter in a capacitor pre-charge operation, wherein the first high voltage switch is in the closed state and the second high voltage switch is in the open state.

4. The system of claim 1, wherein the DC-DC converter further includes:

a middle voltage buck-boost converter having a primary side connected in parallel with the low voltage buck-boost converter and a secondary side connectable to a middle voltage battery.

5. The system of claim 1, wherein the DC-DC converter further includes:

a bridge driver having a primary side connected to the AC-DC converter and a secondary side connected to the one or more transformers.

6. The system of claim 1, wherein the DC-DC converter further includes:

one or more of a primary transformer isolation switch, a high voltage isolation switch, or a low voltage isolation switch.

7. The system of claim 6, wherein the one or more controllers are further configured to control an operation of the one or more of the primary transformer isolation switch, the high voltage isolation switch, or the low voltage isolation switch to control a power transfer between two or more of the line voltage, the high voltage battery, or the low voltage battery.

8. The system of claim 6, wherein the one or more controllers are further configured to control an operation of the one or more of the primary transformer isolation switch, the high voltage isolation switch, or the low voltage isolation switch based on a fault status of one or more of the AC-DC converter, the high voltage buck-boost converter, or the low voltage buck-boost converter.

9. The system of claim 1, further comprising:

the high voltage battery connected to the DC-DC converter; and the low voltage battery connected to the DC-DC converter, wherein the system is provided as a bidirectional battery charger configured to:

receive input AC power from the line voltage through the AC-DC converter, convert the input AC power to output DC power, and supply the output DC power to charge one or more of the high voltage battery or the low voltage battery in a grid-to-battery operation, and receive input DC power from one or more of the high voltage battery or the low voltage battery through the DC-DC converter, convert the input DC power to output AC power, and supply the output AC power to a load of the line voltage in a battery-to-grid operation.

10. The system of claim 1, further comprising:

an electric vehicle including the high voltage battery connected to the DC-DC converter.

11. The system of claim 1, wherein when the DC-DC converter is operating in (ii) the charging mode with the LV only buck operation, the high voltage buck-booster converter operates in a filter and pass mode, (iv) the HV to LV conversion mode with HV only buck operation, the low voltage buck-booster converter operates in a pass mode, and (v) the HV to LV conversion mode with no HV or LV buck operation, the high voltage buck-booster converter operates in the pass mode and the low voltage buck-booster converter operates in the pass mode.

12. A system comprising:

a DC to DC converter (DC-DC converter) including:

a high voltage buck-boost converter having a secondary side connectable to a high voltage battery, the high voltage buck-boost converter including a first high voltage switch and a second high voltage switch, wherein the high voltage buck-boost converter is configured to operate in one or more modes, including at least one mode of the one or more modes where the first high voltage switch is configured to be in an open/closed state that is different from an open/closed state of the second high voltage switch;

a low voltage buck-boost converter having a secondary side connectable to a low voltage battery, the low voltage buck-boost converter including a first low voltage switch and a second low voltage switch, wherein the low voltage buck-boost converter is configured to operate in one or more modes, including at least one mode of the one or more modes where the first low voltage switch is configured to be in an open/closed state that is different from an open/closed state of the second low voltage switch; and one or more transformers having a primary side connectable to an AC-DC converter, a secondary side connected to a primary side of the high voltage buck-boost converter, and a tertiary side connected to a primary side of the low voltage buck-boost converter; and one or more controllers configured to control an operation of the high voltage buck-boost converter and the low voltage buck-boost converter to control a power transfer between two or more of a line voltage, the high voltage battery, or the low voltage battery;

wherein the one or more controllers control an operation of the first high voltage switch, the second high voltage switch, the first low voltage switch, and the second low voltage switch to configure the DC-DC converter into each of (i) a charging mode with both an HV and LV buck operation, (ii) a charging mode with an LV only buck operation, wherein the first high voltage switch is in the closed state and the second high voltage switch is in the open state, (iii) an HV to LV conversion mode with HV and LV buck operation, (iv) an HV to LV conversion mode with HV only buck operation, wherein the first low voltage switch is in the closed state and the second low voltage switch is in the open state, and (v) an HV to LV conversion mode with no HV or LV buck operation, wherein the first high voltage switch is in the closed state, the second high voltage switch is in the open state, the first low voltage switch is in the closed state, and the second low voltage switch is in the open state.

13. The system of claim 12, wherein the one or more controllers are further configured to control an operation of the DC-DC converter to control a power transfer between two or more of the AC-DC converter, the high voltage battery, or the low voltage battery.

14. A method for controlling a system including a DC-DC converter including one or more transformers, a high voltage buck-boost converter including a first high voltage switch and a second high voltage switch, and a low voltage buck-boost converter including a first low voltage switch and a second low voltage switch, the method comprising performing, by one or more controllers, operations including:

controlling an operation of the high voltage buck-boost converter and the low voltage buck-boost converter to control a power transfer through the one or more transformers and one or more of the high voltage buck-boost converter or the low voltage buck-boost converter, wherein the operations further include:

controlling the high voltage buck-boost converter to operate in one or more modes, including at least one mode of the one or more modes where the first high voltage switch is configured to be in an open/closed state that is different from an open/closed state of the second high voltage switch, controlling the low voltage buck-boost converter to operate in one or more modes, including at least one mode of the one or more modes where the first low voltage switch is configured to be in an open/closed state that is different from an open/closed state of the second low voltage switch, and controlling an operation of one or more switches of the DC-DC converter to configure the DC-DC converter into each of (i) a charging mode with both an HV and LV buck operation, (ii) a charging mode with an LV only buck operation, wherein the first high voltage switch is in the closed state and the second high voltage switch is in the open state, (iii) an HV to LV conversion mode with HV and LV buck operation, (iv) an HV to LV conversion mode with HV only buck operation, wherein the first low voltage switch is in the closed state and the second low voltage switch is in the open state, and (v) an HV to LV conversion mode with no HV or LV buck operation.

15. The method of claim 14, wherein the operations further include:

controlling an operation of a bridge driver of the DC-DC converter to operate in each of a half-bridge driver configuration and in a full-bridge driver configuration, and controlling the operation of the high voltage buck-boost converter and the low voltage buck-boost converter based on the operation of the bridge driver.

16. The method of claim 14, wherein the operations further include:

controlling the operation of the high voltage buck-boost converter and the low voltage buck-boost converter based on one or more of a voltage of a line voltage connected to the DC-DC converter, a battery connected to the DC-DC converter, or a power requirement of the DC-DC converter.

17. The method of claim 14, wherein the operations further include:

controlling the operation of the high voltage buck-boost converter and the low voltage buck-boost converter to operate the DC-DC converter in a capacitor pre-charge operation.

*    *    *    *    *